United States Patent [19]
Rey

[11] Patent Number: 5,464,701
[45] Date of Patent: Nov. 7, 1995

[54] LEAKPROOF, VALVE REGULATED, MAINTENANCE-FREE LEAD ACID BATTERY

[75] Inventor: Gonzalo C. Rey, Joplin, Mo.

[73] Assignee: Eagle-Picher Industries, Inc., Cincinnati, Ohio

[21] Appl. No.: 387,300

[22] Filed: Feb. 27, 1995

[51] Int. Cl.⁶ .................................................. H01M 2/12
[52] U.S. Cl. ................ 429/53; 429/72; 429/86; 429/177
[58] Field of Search ................... 429/53, 54, 55, 429/72, 82, 86, 177, 225, 87–89

[56] References Cited

U.S. PATENT DOCUMENTS

| | | |
|---|---|---|
| 1,230,390 | 7/1917 | Flanders . |
| 2,331,450 | 10/1943 | Baum . |
| 2,452,066 | 10/1948 | Murphy ..................... 429/86 |
| 2,615,062 | 10/1952 | Craig . |
| 3,360,403 | 12/1967 | Halsall ....................... 429/86 |
| 3,764,394 | 10/1973 | Phillips . |
| 3,879,227 | 4/1975 | Hennen ..................... 429/86 |
| 4,303,745 | 12/1981 | Anderson et al. . |
| 4,371,591 | 2/1983 | Oxenreider et al. ........... 429/88 |
| 4,463,069 | 7/1984 | Greenlee ................. 429/88 X |
| 4,973,533 | 11/1990 | Nieminen et al. ............ 429/82 |

FOREIGN PATENT DOCUMENTS

| | | |
|---|---|---|
| 401526 | 7/1909 | France . |
| 429332 | 7/1911 | France . |
| 842387 | 3/1939 | France . |
| 860921 | 10/1940 | France . |
| 791139 | 2/1958 | United Kingdom . |

Primary Examiner—Anthony Skapars
Attorney, Agent, or Firm—Wood, Herron & Evans

[57] ABSTRACT

A valve-regulated, maintenance-free lead acid battery has plate compartments which are substantially surrounded by chambers that contain electrolyte absorptive material. Electrolyte droplets escaping through the pressure relief valves of the battery are directed to flow over the absorptive material in the chambers and are absorbed by it, while evolved gas escapes through a vent without appreciable pressure drop. The chambers also protect the plate compartments from impact and absorb electrolyte which might otherwise leak from the plate compartments.

12 Claims, 3 Drawing Sheets

LEAKPROOF, VALVE REGULATED, MAINTENANCE-FREE LEAD ACID BATTERY

FIELD OF THE INVENTION

This invention relates to lead-acid batteries of the valve regulated, maintenance-free type, and more particularly to a means for preventing leakage of electrolyte through the pressure regulating valves of such battery.

BACKGROUND

A lead-acid battery has lead positive plates, lead oxide negative plates, and an electrolyte which is a solution of sulfuric acid and distilled water. The plates and the plate separator material between them are arranged in plate packs in plate compartments. During charging, and especially if there is overcharging, some of the water content of the electrolyte will be hydrolyzed into its component hydrogen and oxygen gases. Batteries of the valve regulated maintenance-free type are constructed so that the hydrolyzed gases are recombined under pressure internally within the battery case to reform water, so that normally no water is lost. Since no water is lost, the batteries are "maintenance-free."

Nevertheless, under certain conditions electrolyte can escape, even from a valve regulated maintenance-free battery. While the battery is being charged, and particularly if it is being overcharged, internal gas generation may take place at so high a rate as to exceed the rate at which the battery can internally recombine the hydrogen and oxygen to reform water. Under such conditions the internal gas pressure rises and must be released from the case. Pressure relief valves are built into the battery, often one for each plate compartment, to regulate internal pressure in that compartment and prevent it from becoming excessive. The pressure relief valves are normally closed and are set to open to release pressure in excess of a predetermined maximum. When venting occurs, gas released through the valve can carry with it entrained droplets of the sulfuric acid electrolyte, so that electrolyte is released along with the gas. The escape of sulfuric acid electrolyte from the battery is highly undesirable: it can quickly corrode electrical connections to the battery or attack adjacent electrical circuitry.

The problem of electrolyte leakage through a pressure regulating valve is most likely to arise where the battery is used in an application in which it is not oriented in an upright attitude, as when the battery is on its side or upside down. This arises, for example, where the battery is used in a portable light or as standby power for exit or emergency lighting. An emergency light is often mounted on the wall or ceiling of a room, in such position that the battery is tilted 90% from upright or is even inverted. Normally, emergency lighting batteries are in a float or standby condition in which they are given only a small or trickle charge sufficient to maintain them at full charge without gas venting. However, if there is a failure of external power, the battery may have to provide power for a prolonged period and may become deeply discharged. If a deeply discharged battery is recharged at high current, internal gas pressure from dissociated water molecules tends to rise rapidly and the pressure relief valves may open. If the battery is on its side and particularly if it is in an inverted position, the valves will most likely be covered by liquid electrolyte. Release of gas through the valve can sweep electrolyte out with it, and thereby lead to the problems just noted.

It is known to filter gas and electrolyte released from a valve regulated, non-maintenance free battery in order to remove the electrolyte, as shown in British patent No. 791,139 and Baum U.S. Pat. No. 2,331,450. The filters carry electrolyte-neutralizing compounds such as sodium carbonate that react with the electrolyte to form a harmless salt, while permitting the gas to escape through a vent. However, the salt produced by neutralization tends to clog the filter and eventually to impede gas release, and thus requires periodic cleaning. In a valve regulated battery, it is desirable to provide a means for separating electrolyte droplets from vented gas without at the same time creating salts or otherwise restricting the release of the gas, and without significantly or undesirably increasing the internal pressure in the battery.

BRIEF DESCRIPTION OF THE INVENTION

In accordance with this invention, a valve regulated maintenance-free battery is provided wherein gas and any electrolyte entrained in it are vented through the pressure release valve into a closely adjacent chamber containing a porous, gas permeable electrolyte-absorbing material which absorbs and retains the electrolyte but permits the vented gas to escape. The electrolyte is absorbed and retained as electrolyte; that is, it is not neutralized. Electrolyte is absorbed in part by the passage of the gas over the surface of the absorbent medium, which is positioned between the inlet to the absorbent-containing chamber, and the vent from it. The volume of the absorbing medium is most preferably sufficient to absorb all the electrolyte that is present in the respective plate chamber. A separate electrolyte-absorbing chamber is preferably provided for each plate compartment so that each chamber has to absorb only a fraction of the total amount of electrolyte.

The electrolyte-absorbing chambers are preferably arranged to externally surround or encase the sides of the respective plate compartments. Thus, if a plate compartment should crack, electrolyte would tend to leak into one of the surrounding chambers containing the absorbent, and be retained there without leakage to the outside of the battery. In order to establish the smallest possible overall volume of the case, the absorbing chambers are preferably triangular in cross section with their long sides being formed by side walls of the plate compartments. Thus the side walls of the plate compartments are angulated, rather than parallel, to the outside walls of the case. The electrolyte chambers protect and insulate the corners and side walls of the plate compartments from impact or crack damage.

DETAILED DESCRIPTION

Figure 1:
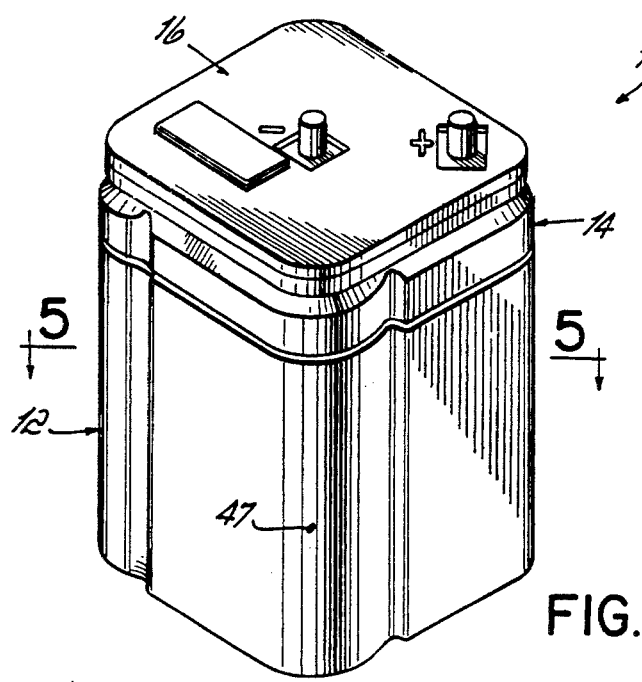
FIG. 1 is a perspective view of a battery in which a preferred form of the invention is embodied.

In a preferred embodiment of the invention, as shown in the figures, a valve regulated lead-acid battery designated generally by 10 is contained within a case comprising a lower housing 12, an inner cover 14, and a top or top cover 16. Lower housing 12 contains one or more side-by-side plate compartments 18, which are generally rectangular in horizontal cross-section. In the preferred embodiment shown there are three plate compartments 18a, b, and c, and three corresponding electrolyte-absorbing chambers 20a, b, and c, respectively, each chamber 20 receiving gas vented from a different plate compartment 18 (FIG. 5). The chambers 20 are preferably arranged outwardly of and around the group of plate compartments, on the sides of housing 12 so that the chambers 20 almost entirely surround the side walls of the group of plate compartments. Preferably the chambers 20 are approximately triangular as viewed in horizontal cross section (FIG. 5), with rounded corners between their shorter sides, and are arranged so that the longest side is adjacent to the vertical (side) wall of a plate compartment. For purposes of symmetry if there are three plate compartments, a fourth or dummy chamber 21 may be provided, so that preferably there is a chamber 20 or 21 on each side face of the approximately square sectioned housing, one on each side of the plate compartments. Viewed in cross-section the plate compartments form a square that is turned or angulated within what is in effect a larger square defined by the electrolyte absorbing chambers 20 and 21 around them. The electrolyte retaining chambers 20 may extend substantially the same full height as the plate compartments (see FIG. 4), but they are quite thin in dimension perpendicular to the side walls of the plate compartments.

In each plate compartment 18 is positioned a plate pack 19 comprising one or more positive plates 23 and negative plates 25, separated by separators 27. The nature of the plate packs may be conventional and is known per se. All the positive plates in each plate compartment are electrically connected together and to an external positive post; similarly, the negative plates are electrically connected to an external negative post. Each plate compartment holds electrolyte 28 which comprises sulfuric acid dissolved in water. During at least the recharging portion of the operating cycle of the battery there is unabsorbed or free liquid electrolyte 28 within each plate compartment.

Figure 3:
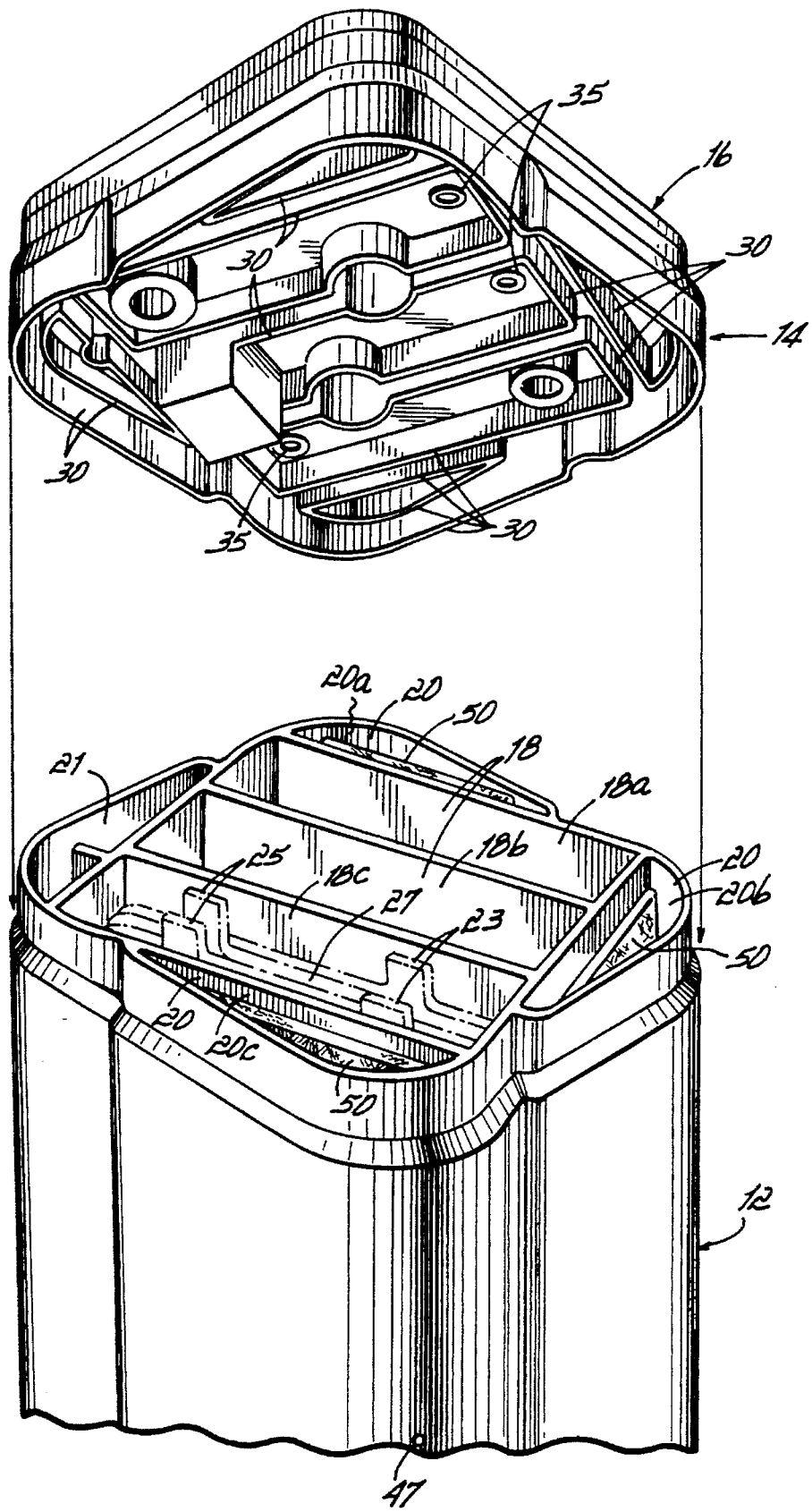
FIG. 3 is a view similar to FIG. 2 but depicts the inner cover and the lower housing of the battery.
Figure 4:
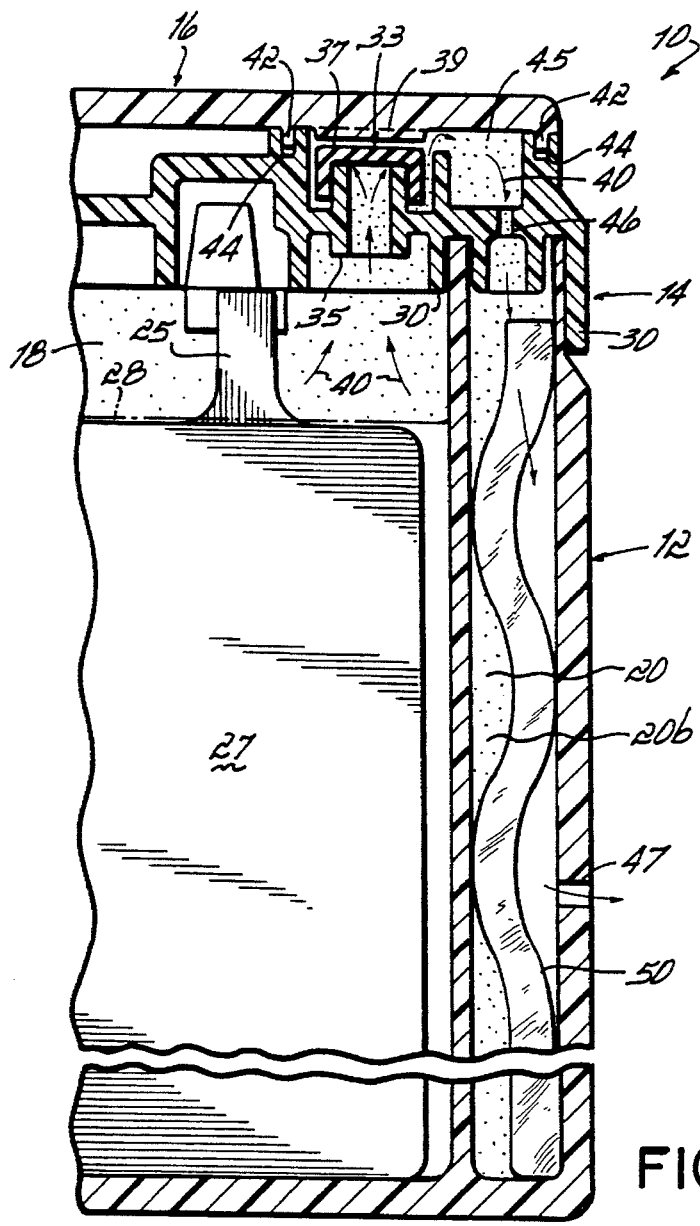
FIG. 4 is a cross-section taken on line 4—4 of FIG. 2.
Figure 5:
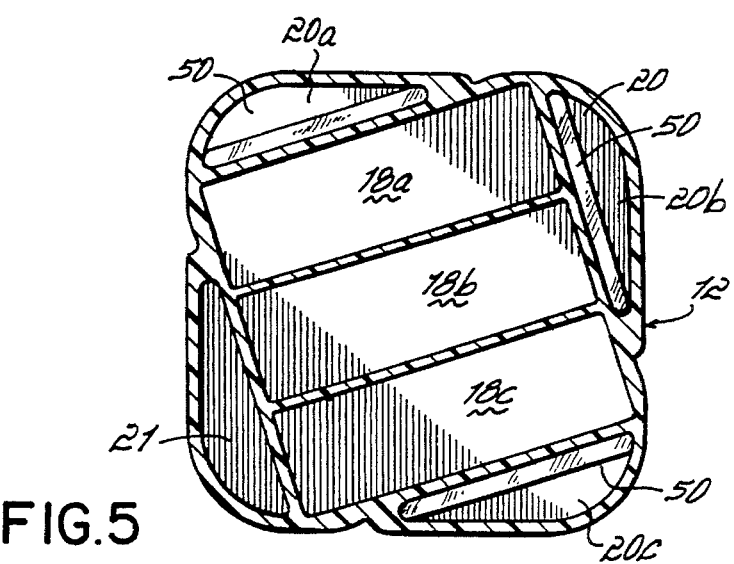
FIG. 5 is a cross section taken on line 5—5 of FIG. 1.

Lower housing 12 is closed and sealed by an inner cover 14 which, as can be seen in FIGS. 3 and 4, is configured on its lower surface with depending grooved flanges or ribs 30 which correspond to and receive the upper edges of the partitions that define the respective compartments and chambers 18, 20, and 21. The ribs 30 of inner cover 14 are sealed to the partitions of housing 14 by epoxy resin or ultrasonic seal so that electrolyte cannot leak from one compartment 18 over the edge of the internal partition into an adjacent compartment.

Figure 2:
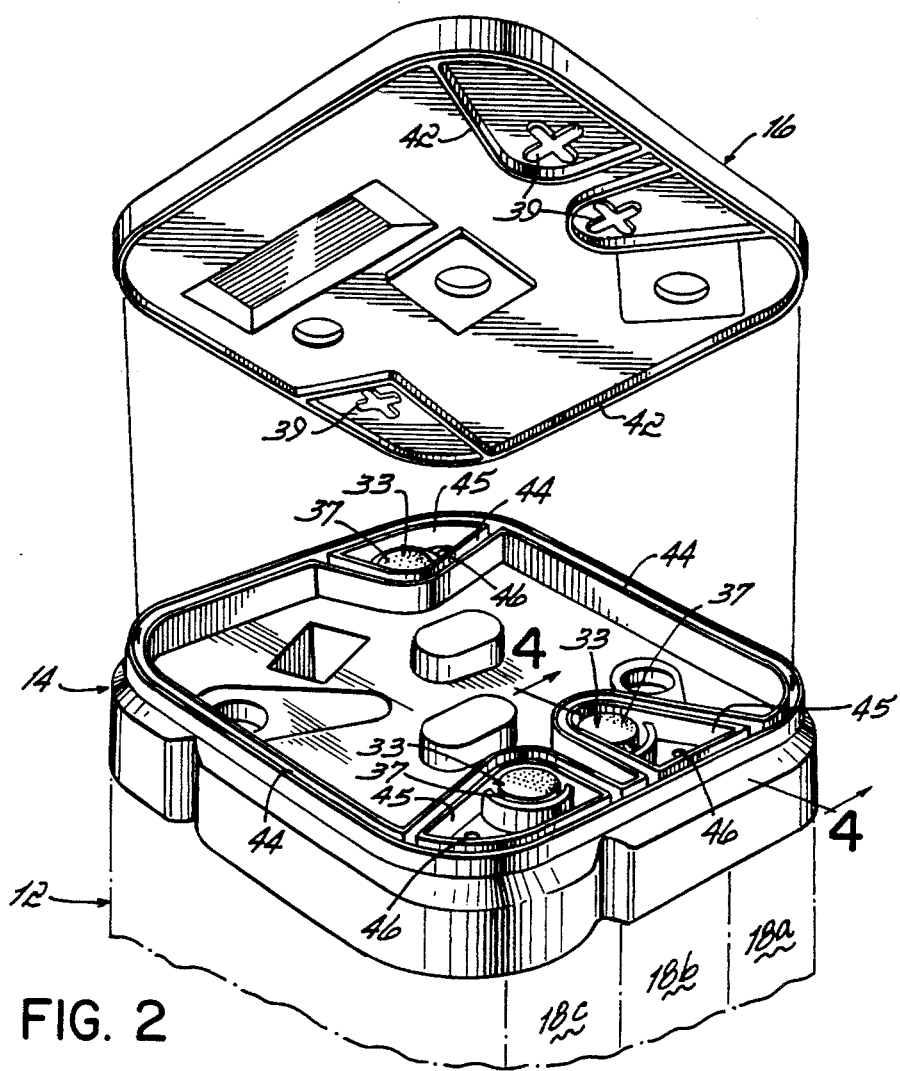
FIG. 2 is a disassembled partial perspective view of the battery of FIG. 1, showing the top and the inner cover of the battery.

As seen in FIGS. 2 and 4, inner cover 14 mounts pressure relief valves 33 for the respective plate compartments 18a, b, and c. Each valve 33 has a body in the form of a short upstanding tube 35 which opens downwardly through the inner cover 14 to the respective plate compartment below it, and carries an inverted U-sectioned elastic valve member 37 which snugly fits over the upper end of tube 35. Valve member 37 is made of a non-reactive elastic material, and normally closes tube 35 to contain pressure in the chamber 18 below it. It is biased downwardly on the tube (to closed position) by a boss 39 which projects from top cover 16 above it. As can be seen in FIG. 2, boss 39 may be in the shape of a "+" so that it bears on only a portion of the top surface of valve member 37. When gas pressure beneath the valve member in the plate chamber exceeds a predetermined value (preferably about 2.5 psi), it lifts the valve member 37 upwardly in the areas between the arms of the boss 39 and gas escapes across the top of tube 35 and downwardly between the valve member skirt and the outside surface of the tube 35. It is observed that even though the valve opening so created may be very small, the outward rush of gas can carry entrained electrolyte droplets out with it through the valve, as shown by arrows 40.

Top 16 has ribs 42 on its under surface which interfit with and seal grooves 44 in the top edges of the partitions on the top surface of inner cover 14, and thereby isolates each valve 33 from the others and creating valve compartments 45. The ribs 42 are sealed to the grooves 44 preferably by thermal welding or epoxy resin after the battery has been assembled.

Closely adjacent each pressure relief valve 33 in its respective valve compartment 45 is an inlet opening 46 through inner cover 14 which provides communication from the valve compartment 45 into the respective electrolyte absorbing chamber 20a, b, or c. A vent 47 (FIGS. 1 and 4) is provided in the outer side wall, preferably at the rounded corner of each chamber 20.

As apparent from FIG. 3, the electrolyte absorbing chambers 20a, b, and c are preferably elongated vertically, but narrow in the dimension toward the vertical center axis of the case. Each contains a porous gas permeable material 50 which is highly absorptive of sulfuric acid electrolyte. A preferred material for this purpose is borosilicate microfiber fiberglass mat separator material in sheet form, having a weight per unit surface area in the range of roughly 130 $gm/m^2$ or more. It need not be packed or stuffed in its chamber, and does not tightly or entirely fill the interior volume of the chamber between the inlet opening 46 and vent 47. There may be a flow space over the surface of the absorbent material from the inlet to the vent, as well as flow passages through the mat as a filter.

It is important to note that the escaping gas need not necessarily be filtered by passing it lengthwise through the absorbent in order for electrolyte to be absorbed. That is, the gas need not flow through the absorbent either longitudinally or transversely. Indeed, much of the effectiveness of this material in absorbing gas droplets from the gas flow is that contact of the droplets with the outer surface of the sheet or mat is apparently effective for their absorption. The distance the gas flows over the surface of the mat from inlet to vent is preferably several times longer, e.g., at least about 5 times longer, than the distance it must flow transversely through the mat.

This structure has been found remarkably effective to absorb electrolyte without the pressure drop that often accompanies filtration, and without need for a neutralizing compound which might plug a filtering material and render it ineffective, or at least cause an undesirably high pressure drop to arise on flow through it.

The volume of the electrolyte-absorbing material should preferably be sufficient to absorb at least about ⅓, and more preferably virtually all, of the free electrolyte from the plate compartment it serves. Thus if the battery 10 should vent while in an inverted position and all of the gases or the free electrolyte escape through the valve, the absorber material should be large enough volumetrically to absorb all the droplets contained in the gas, or the electrolyte itself.

The absorber retains the electrolyte indefinitely within it. Normally the electrolyte does not drain or "puddle" in the chamber which might, depending on attitude, permit it to escape through the vent.

EXAMPLE

A 6-volt, 4.0 ampere-hour battery having three plate compartments, each initially containing 30 ccs of electrolyte, has three electrolyte absorbing compartments arranged as shown in the drawings. Each compartment is 3.32" high×0.64" wide×2.10" long. Each compartment contains one or more pieces of "BG-16005 Hovosorb" separator mat material made by Hollingsworth & Vose Corp. The mat in each chamber was 0.095"thick×3.20"high×1.24"wide. Its volume is sufficient to absorb virtually all the droplets and all the unabsorbed electrolyte in the plate compartment. The mat is slid into the chamber from the top end thereof before the top cover is applied and does not fill the chamber, the internal dimensions of which are 3.32" high×0.28" wide× 1.45" long.

Having described the invention, what is claimed is:

1. A valve regulated, maintenance-free lead-acid battery comprising a case, at least one plate compartment in the case, each said compartment containing plates and electrolyte, an electrolyte-absorbing chamber in said case for each said compartment, each said chamber having a vent to atmosphere, and a pressure regulating valve associated with each compartment, for releasing gas pressure within that compartment in excess of a predetermined value, each said valve having a downstream side which communicates with an inlet to a respective one of said chambers, each said chamber containing a gas permeable, electrolyte absorptive inert material, said absorptive material positioned between said inlet and said vent of said chamber so that gas released through the downstream side of said valve flows through said absorptive material in passing to the said vent, the path of contact of said gas within said absorptive material being sufficiently long that substantially all droplets of said electrolyte entrained in said released gas are absorbed by said material and are not swept out said vent.

2. The battery of claim 1 wherein the volume of said absorptive material in each chamber is sufficient to absorb at least about ⅓ the volume of electrolyte in the respective plate compartment.

3. The battery of claim 1 wherein each said inlet is at an upper end of the respective chamber.

4. The battery of claim 3 wherein said vent is in a sidewall of the respective chamber, below the top of the absorptive material in that chamber.

5. The battery of claim 1 wherein said absorptive material is microfiber fiberglass separator.

6. The battery of claim 1 wherein said absorptive material is a mat in sheet form.

7. The battery of claim 6 wherein gas released through each said valve, in flowing to said vent, flows over the surface of said mat a distance several times greater than that it flows through said mat.

8. The battery of claim 6 wherein there is a gas flow space from said inlet to said vent, between said mat and a wall of said chamber.

9. The battery of claim 1 wherein said valve opens when the pressure in said plate compartment exceeds about 2.5 psi.

10. The battery of claim 1 wherein each said valve and the respective chamber, absorptive material and vent associated with the chamber, are arranged and sized to establish a pressure drop between the respective inlet and vent, while gas is being vented through said valve, which is less than the pressure at which the valve opens.

11. The battery of claim 1 having at least three plate compartments and at least three electrolyte-absorbing chambers, and said chambers substantially surround the sides of said plate compartments.

12. A valve regulated, maintenance-free lead-acid battery comprising a case, at least three plate compartments in said case, each said compartment containing plates and electrolyte, at least three electrolyte-absorbing chambers in said case, each said chamber having a vent to atmosphere, and a pressure regulating valve associated with each said compartment for releasing gas pressure within that compartment, each said valve having a downstream side which communicates with an inlet to a respective one of said chambers, each said chamber containing a gas permeable, electrolyte absorptive inert material, said absorptive material positioned between said inlet and said vent of said chamber so that gas released through the downstream side of said valve flows through and over said absorptive material in passing to the said vent, said chambers substantially externally surrounding the sides of said plate compartments and thereby protecting said compartments from impact and absorbing electrolyte which may leak from them.

* * * * *

UNITED STATES PATENT AND TRADEMARK OFFICE
CERTIFICATE OF CORRECTION

PATENT NO. : 5,464,701
DATED      : November 7, 1995
INVENTOR(S) : Gonzalo C. Rey It is certified that error appears in the above-indentified patent and that said Letters Patent is hereby corrected as shown below:

Column 5, line 25, delete "in excess of a predetermined value"

Signed and Sealed this

Twenty-third Day of April, 1996

Attest:

BRUCE LEHMAN

*Attesting Officer*       *Commissioner of Patents and Trademarks*